(12) United States Patent
Morrison et al.

(10) Patent No.: US 6,600,972 B2
(45) Date of Patent: Jul. 29, 2003

(54) ELECTRO-STATICALLY-SHIELDED PROCESSING MODULE

(75) Inventors: Brian D. Morrison, Hopkinton, MA (US); Paul A. Connolly, Milford, MA (US)

(73) Assignee: CBL Acquisition LLC, Hopkinton, MA (US)

( * ) Notice: Subject to any disclaimer, the term of this patent is extended or adjusted under 35 U.S.C. 154(b) by 0 days.

(21) Appl. No.: 10/039,044

(22) Filed: Jan. 3, 2002

(65) Prior Publication Data

US 2002/0065582 A1 May 30, 2002

Related U.S. Application Data

(63) Continuation of application No. 09/330,405, filed on Jun. 11, 1999, now Pat. No. 6,356,809.

(51) Int. Cl.[7] ............................................. G05D 11/00
(52) U.S. Cl. ....................... 700/286; 700/22; 700/292
(58) Field of Search ............................. 700/21, 22, 79, 700/286, 28 T, 292; 709/230; 73/1.35

(56) References Cited

U.S. PATENT DOCUMENTS

| | | | | |
|---|---|---|---|---|
| 4,918,619 A | * | 4/1990 | Orloff et al. | 364/509 |
| 5,470,395 A | * | 11/1995 | Yater et al. | 136/203 |
| 5,706,278 A | * | 1/1998 | Robillard et al. | 370/222 |
| 5,796,935 A | * | 8/1998 | Morrison et al. | 395/182.09 |
| 5,809,220 A | * | 9/1998 | Morrison et al. | 395/182.1 |

FOREIGN PATENT DOCUMENTS

EP 0 754 991 A1 1/1997

OTHER PUBLICATIONS

"Smart Card Using Solar Cell for Power and Information Communication," IBM Technical Disclosure Bulletin, IBM Corp., New York, U.S., vol. 30, No. 8, 1988, pp. 396–397.

Glista, A., "A Shunted Ring Fiber Optic Network Topology Providing Fault Detection, Isolation and Circumvention," Aerospace and Electronics Conference, 1993, Naecon 1993, Proceedings of the IEEE 1993 National Dayton, OH, U.S. May 24–28, 1993, New York, NY U.S., pp. 144–151.

Majewski, M. et al., "Distortion Characteristics in Directly Modulated Laser Diodes by Microwave Signals," IEEE MMT–S Digest, 1989, pp. 1167–1170.

* cited by examiner

Primary Examiner—Paul P. Gordon
(74) Attorney, Agent, or Firm—Kevin A. Oliver; Foley Hoag LLP (57) ABSTRACT

A fuel measuring system includes a package adapted for mounting to a fuel storage vessel. The package includes an electro-statically shielded enclosure. A processor element is disposed in the enclosure and is adapted for coupling to a fuel sensor disposed in the storage vessel. A communication interface is provided for coupling data through the enclosure between the processor and a processor external to the package through a dielectric transmission media passing through the enclosure. A power supply for the processor element disposed in the enclosure, such power supply being adapted to generate power for the processing element in response to input energy. An energy interface is provided for coupling the input energy from a source external to the enclosure through dielectric transmission media passing through the enclosure. With such an arrangement both data to the electro-statically shielded processor and energy to the electro-statically shielded power supply are coupled to the electro-statically shielded enclosure through dielectric media. Therefore, electrical disturbances external to the enclosure will not be carried by conductive wires into the enclosure and then into the fuel tank which might thereby cause a hazardous condition in the fuel in the tank.

33 Claims, 5 Drawing Sheets

ELECTRO-STATICALLY-SHIELDED PROCESSING MODULE

CLAIM OF PRIORITY

This application is a continuation of U.S. Ser. No. 09/330,405 entitled "Electro-statically Shielded Processing Module," naming Brian D. Morrison and Paul A. Connolly as inventors, filed on Jun. 11, 1999, now U.S. Pat. No. 6,356,809 issued Mar. 12, 2002 the contents of which are hereby incorporated herein by reference in their entirety.

BACKGROUND OF THE INVENTION

This invention relates generally to electronic packages and more particularly to packages adapted to house processing elements which are part of a distributed control system.

As is known in the art, a highly successive distributed control system is described in U.S. Pat. Nos. 5,706,278, 5,809,220 and 5,796,935 all assigned to the same assignee as the present invention, the entire subject matter of each of such patents being incorporated herein by reference. Such patents describe, a fault tolerant distributed control system for sensing and control across a fault tolerant fiber optic communication media interconnecting a plurality of intelligent nodes. Each intelligent node comprises: a digital communication processor (DCCP) operating autonomously in relation to DCCPs at other nodes; and, a transceiver interfacing with the communication media. The fiber optic communication media comprises bi-directional serial data busses. The combination provides a low cost, highly reliable distributed control system particularly applicable to primary and secondary aircraft control systems, as well as to other vehicle and control systems, for example.

As is also known in the art, the National Transportation and Safety Board (NTSB) and the Federal Aviation Agency (FAA) are becoming increasingly concerned about the amount of energy which can enter today's aircraft fuel tanks; whether as a designed level, or from externally coupled sources (e.g., lightening, surge, short-circuits, etc.). One of the primary reasons listed by the NTSB for the TWA Flight 800 explosion is electrical energy coupling in the fuel tank. Recent efforts to reduce this source of fuel explosion have focused on reducing the level of designed energy inside the tank; but, such efforts have faced a difficult task of quantifying and proving that unintended, or sneak, paths do not, and cannot exist. The failure hazards analysis is a long, and complex process.

SUMMARY OF THE INVENTION

In accordance with the invention, a package is provided. The package includes an electro-statically shielded enclosure. A processor is disposed in the enclosure. A communication interface is provided for coupling data between the processor and a processor external to the package with such data passing through the enclosure. A power supply is provided for the processing element disposed in the enclosure. The power supply is adapted to generate power, for the processing element, in response to input energy. An energy interface is provided for coupling the input energy from a source external to the enclosure through a dielectric transmission media passing through the enclosure.

In one embodiment of the invention, the communication interface has a dielectric transmission media, for coupling data through the enclosure between the processor and a processor external to the enclosure, such media passing through the enclosure.

With such an arrangement both data to the electro-statically shielded processor and energy to the electro-statically shielded power supply are coupled to the electro-statically statically shielded enclosure through dielectric media. Therefore, electrical disturbances external to the enclosure will not be carried by conductive wires into the enclosure.

In one embodiment of the invention, a package is provided having an electro-statically shielded enclosure. A processor is disposed in the enclosure. A communication interface, having a dielectric transmission media, is provided for coupling data through the enclosure between the processor and a processor external to the enclosure, such media passing through the enclosure. A power supply for the processor is disposed in the enclosure, such power supply being adapted to generate power in response to input energy. An energy interface, having a dielectric transmission media, is provided for coupling the input energy from a source external to the enclosure through the dielectric transmission media of the energy interface, such energy interface dielectric transmission media passing through the enclosure.

In accordance with another embodiment of the invention, the communication interface has a fiber optic transmission media for coupling data between the processor and a processor external to the package through the fiber optic transmission media, such fiber optic transmission media passing through the enclosure. The power supply for the processing element disposed in the enclosure comprising a photocell adapted to generate power for the processing element in response to light energy produced outside the enclosure. The energy interface has a fiber optic transmission media for coupling the light energy produced outside the enclosure through the energy interface fiber optic transmission media, such energy interface fiber optic transmission media passing through the enclosure.

In accordance with another embodiment of the invention, a fuel measuring system is provided. The fuel measuring system includes a package adapted for mounting to a fuel storage vessel. The package includes an electro-statically shielded enclosure. A processor element is disposed in the enclosure and is adapted for coupling to a fuel sensor disposed in the storage vessel. A communication interface is provided for coupling data through the enclosure between the processor and a processor external to the package through a dielectric transmission media passing through the enclosure. A power supply for the processor element disposed in the enclosure, such power supply-being adapted to generate power for the processing element in response to input energy. An energy interface is provided for coupling the input energy from a source external to the enclosure through dielectric transmission media passing through the enclosure.

With such an arrangement both data to the electro-statically shielded processor and energy to the electro-statically shielded power supply are coupled to the electro-statically shielded enclosure through dielectric media. Therefore, electrical disturbances external to the enclosure will not be carried by conductive wires into the enclosure and then into the fuel tank which might thereby ignite the fuel in the tank.

In one embodiment, the power supply comprises a fiber coupled photocell.

In accordance with yet another embodiment of the invention, a fuel monitoring system is provided. The system includes a plurality of fuel measuring systems, each one thereof having a package adapted for mounting to a corresponding one of a plurality of fuel storage vessels. Each one of the packages comprising: (i) an electro-statically shielded enclosure; (ii) a processing element disposed in the enclosure and adapted for coupling to a fuel sensor disposed in the storage vessel coupled thereto; (iii) a communication interface for coupling data through the enclosure between the processing element and a processing element external to the package through a dielectric transmission media passing through the enclosure; (iv) a power supply for the processing element disposed in the enclosure, such power supply being adapted to generate power for the processing element in response to input energy; and, (v) an energy interface for coupling the input energy from a source external to the enclosure through a dielectric transmission media passing through the enclosure. A distributed control system is provided for sensing and controlling the processing elements in the plurality of fuel gauges across a fault tolerant fiber optic communication media interconnecting the processing elements at each one of a plurality of nodes of the system. Each one of such nodes comprises the processing element. The processing element comprising a digital communication processing element adapted to operate autonomously in relation to the other processing elements at the other nodes and a communication interface comprising a transceiver interfacing with the communication media.

In one embodiment of the invention, the fiber optic communication media comprises bi-directional serial data busses.

DESCRIPTION OF THE PREFERRED EMBODIMENTS

Figure 1:
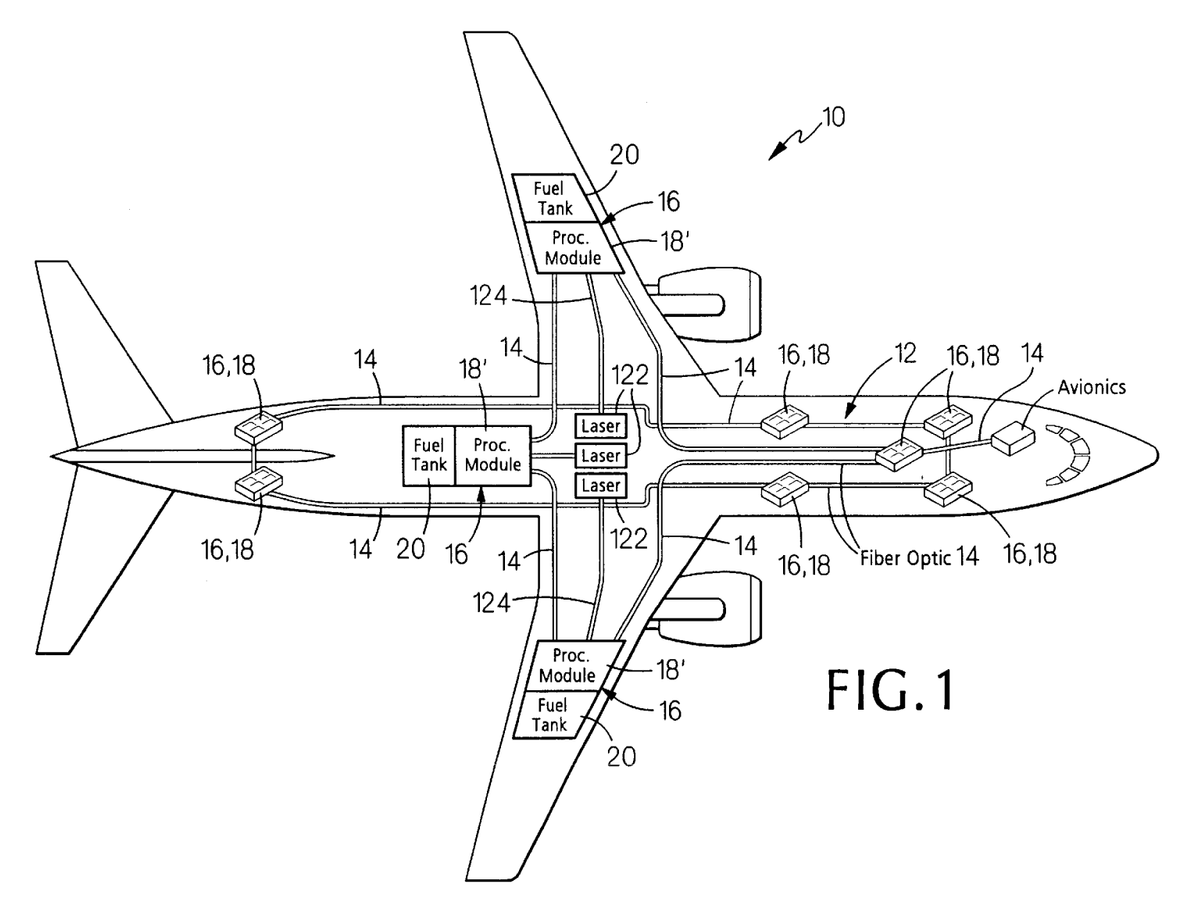
FIG. 1 is a diagrammatical cut-away sketch of an aircraft having a fault tolerant distributed control system for sensing and control across fault tolerant fiber optic communication media interconnecting a plurality of intelligent nodes, a portion of such nodes monitoring fuel tanks in the aircraft, such portion of the nodes having electro-statically shielded enclosures for processing units used in such control system according to the invention.

Referring now to FIG. 1, an aircraft 10 is shown having a fault tolerant distributed control system 12 for sensing and control across fault tolerant fiber optic communication media 14 interconnecting a plurality of intelligent nodes 16. Each intelligent node 16 comprises: a digital communication processor and transceiver, hereinafter sometimes referred to as a processing module 18, operating autonomously in relation to modules 18 at other nodes 16. The transceiver in the module 18 is used for interfacing with the communication media 14. The fiber optic communication media 14 comprises bi-directional serial data busses, here fiber optic cables. The combination, described in the above referenced U.S. patents, provides a low cost, highly reliable distributed control system particularly applicable to primary and secondary aircraft control systems. A plurality of the processing modules 18, here modules 18', is used to monitor fuel in a corresponding one of the fuel tanks 20 of the aircraft. It should be understood, as described in the above referenced U.S. patents, that the distributed local intelligent nodes are used to sense and/or control physical parameters of the fuel sensors with messages being passed across redundant serial buses whenever sense or control information changes. In order to achieve fault tolerant operation, two, three, four, or more redundant data buses may be employed depending upon the criticality. Redundancy is also employed in certain intelligent nodes performing critical functions such as sensor/actuator functions in an aircraft control system. The coupling of the nodes to the serial data buses is accomplished by transceivers within the modules 18 and each transceiver is connected to a digital control and communication processor (DCCP) within the module 18. Each combination of a transceiver and a DCCP may be referred to as a processing element or module. By distributing the system intelligence to every node, network communications is reduced, autonomy for failure-recovery is enhanced, and reliability is improved.

In an aircraft application of the control system 12, information flow between node computers can be minimized by distributing the control algorithms across the aircraft. It becomes possible to design a set of global data messages which pass across the communication network and correspond to aircraft state, physical parameters, and pilot commands. Individual nodes may subscribe to a given set of messages depending on the function they perform. For example, here, where fuel in each of the tanks is monitored a fuel availability computer would subscribe to messages indicating the fuel state of the aircraft while other processing units indicate the state of the fuel pumps, the state of the engine fuel flow, and whether the pilot has commanded fuel balancing, etc.

The control system 12 uses fiber optic communication media 14 as serial data buses which support multiple message transmitters. The bus network relies on a distributed media access technique to eliminate collisions, while at the same time not introducing any single points of failure. The advantages of a collision free network protocol are well known and are especially desirable for aircraft control systems or other critical control system applications.

The bus network supports bi-directional communications over a single fiber by restricting communications to half duplex. This has the obvious benefit of reducing the cost to interconnect processing nodes to a single fiber. Each processing module 18 has two bi-directional, half duplex ports. This allows large networks to be created by connecting together processing elements into rings. Each node within the network or ring is connected to its neighbors by a bi-directional, half-duplex point to point fiber link. As a message propagates around the network, the message is regenerated at each node 16. To prevent a single node or link failure from disabling the network, every message is transmitted across the ring in both directions and is removed from the ring by the node which receives it from both directions. This method of transmission guarantees the delivery of all messages to all operating nodes, in the event of single hardware failures or fiber breaks.

The control system 12 uses combinations of traditional fault tolerant techniques including hardware redundancy, software redundancy, temporal redundancy, and information redundancy. Flight critical functions are implemented using nodes composed of multiple processing elements. Hardware and software voters are utilized to ensure the validity of commands. Multiple, independent data buses are utilized to ensure the validity of data. Asynchronous sampling techniques are used to reduce the effects of transient upsets or disturbances. Software design includes techniques such as recovery blocks and reasonableness checking known to those of ordinary skill in the art of software fault tolerance as described in the above-referenced U.S. patents.

Figure 2:
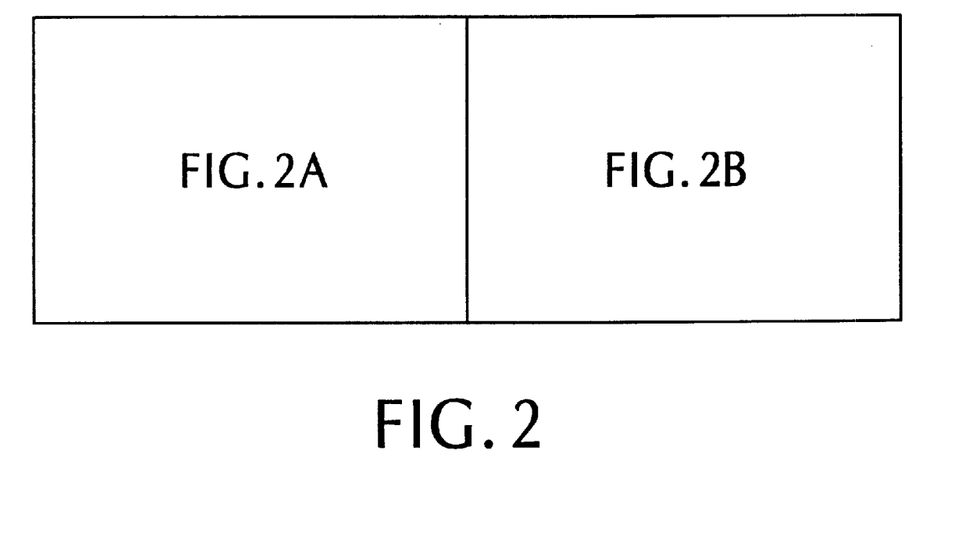
FIGS. 2, 2A, and 2B are cross-sectional sketches of an exemplary one of the portion of the nodes used to monitor fuel in one of the tanks of the aircraft; and, FIG. 3 is a diagram showing an arrangement of fuel tanks and nodes used to monitor fuel in different tanks of the aircraft.
Figure 2A:
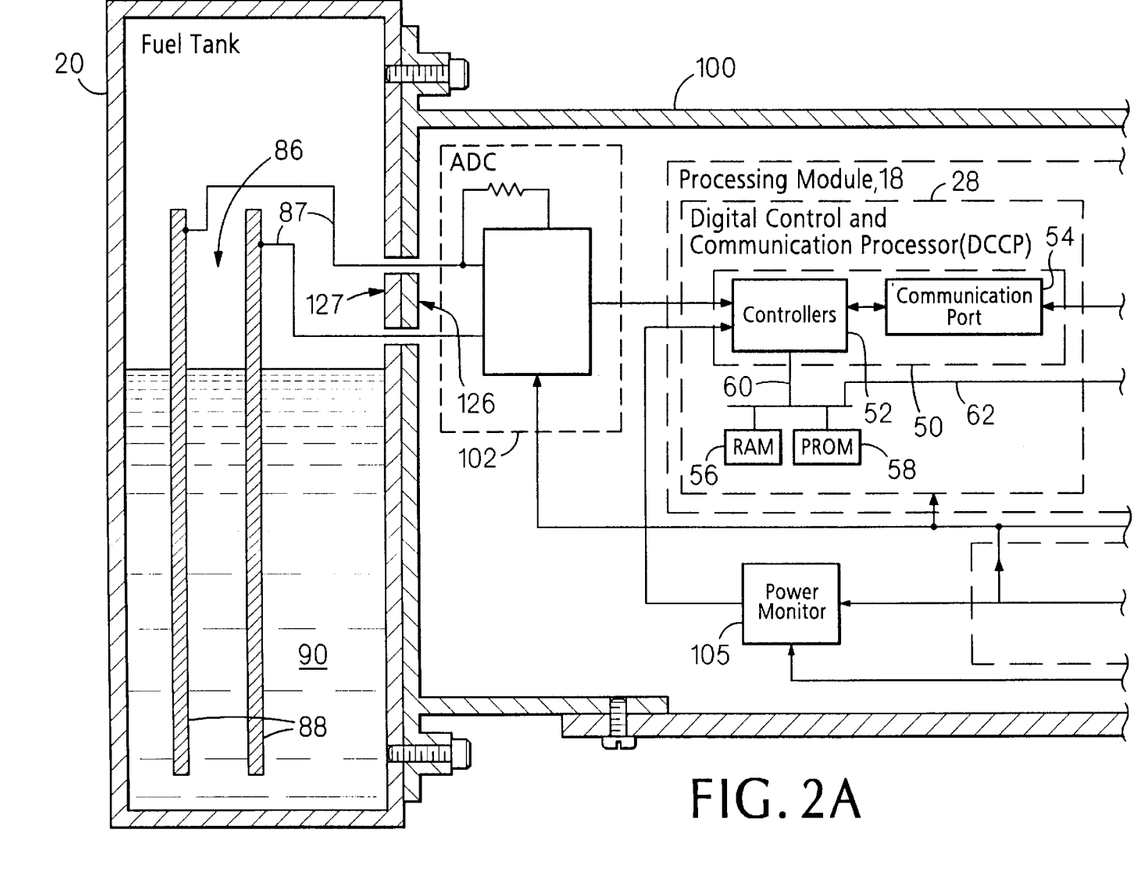
Figure 2B:
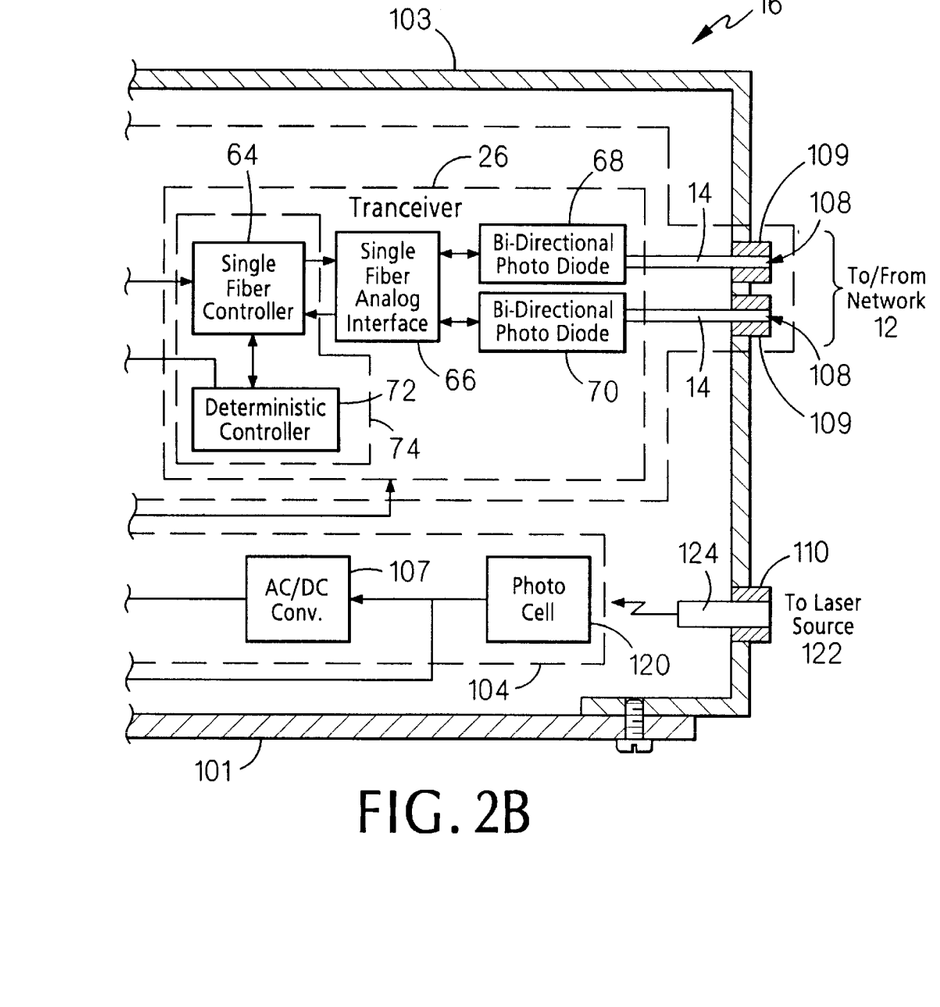

Referring to FIG. 2, an exemplary one of the fuel tanks 20 and a processing module 18' is shown. The processing module 18' includes a digital control and communication processor (DCCP) 28 and the transceiver 26. The DCCP 28 provides the network and applications-specific processing within a node to process inputs from sensors and control devices intelligently and propagate control information across a network 12 such as is shown in FIG. 1. The DCCP 28 comprises chip 50 (e.g., a VLSI chip) having three controllers 52 which include a media access control (MAC) processor, a network processor and an application processor; all three controllers 52 communicate on common address and data bus 60 to a random access memory (RAM) 56 and non-volatile, programmable read only memory (PROM) 58. The three controllers 52 are coupled to a network communication port 54 which interfaces with the single fiber controller 64 of transceiver 26. The transceiver 26 and in particular the deterministic controller 72 is connected to the bus 60 via a bus extension 62. The RAM 56 provides general purpose storage of network messages and program variables. The PROM 58 stores programs and configuration data for the three controllers 52, including a media access control system routine described hereinafter for initiating a priority or a non-priority message onto the network bus. The operation of the chip 50 is described in a Neuron Data Book dated February 1995 for the 3150 chip published by Echelon Corporation of Palo Alto, Calif. which is incorporated herein by reference. The chip 50 may be embodied by Part No. MC143150 manufactured by Motorola Inc. of Phoenix, Ariz. or similar such chips. Other similar microcontrollers with network communication capabilities may also be used to implement the chip 50 or capabilities may be implemented using VHDL models which implement the necessary capabilities. The RAM may be embodied by Part No. CY7C199 manufactured by Cypress Semiconductor of San Jose, Calif.

Referring to FIGS. 1 and 2, the transceiver 26 receives and transmits data over the bi-directional data bus. Data packets from or to the fiber optic data bus are passed through bi-directional photo diodes 68, 70 which are coupled to a single fiber analog interface (SFAI) 66 or, alternatively, through separate transmit photo diodes and receive photo diodes or laser diodes which require two fiber optic cables between each node and dual fiber analog interfaces although two fiber optic cables are required. The uni-directional diodes are less costly. The SFAI 66 converts low level analog signals from the bi-directional photo diodes 68, 70 to CMOS or TTL levels and vice-versa. The bi-directional diodes 68, 70 function in a "ping-pong" mode whereby they operate as either a receiver or a transmitter. The photo-diodes 68, 70 may also operate unidirectional whereby the operation is receive only or transmit only. Providing support for two ping-pong diodes allows for data transfers to occur in different communication topologies, e.g. a ring or star configuration. The SFAI 66 provides for rapid packet mode response from a quiet network condition to packet detection and the SFAI 66 provides for minimal turn around time from transmit to receive mode or from receive to transmit mode. The SFAI 66 converts the inputs of the photo diodes 68, 70 to digital signals when in the receive mode and it converts digital signals to drive signals required by the bi-directional photo diodes 68, 70 in the transmit mode. The SFAI 66 may be embodied by Part No. G641848-3 manufactured by Raytheon Company of Marlborough, Mass. The bi-directional photo diodes 68, 70 may be embodied by Model 1A2121-SMA2A manufactured by MITEL Semiconductor, the fiber optic data buses may be embodied by fiber optic cable such as Part No. BF04499 manufactured by Spectran Corp. of Avon, Conn. The SFAI 66 is connected to a single fiber controller (SFC) 64 which is connected to a deterministic controller (DC) 72. The SFC 64 interfaces with a communication port 54 of the DCCP 28 and the DC 72 interfaces with buses 60,62 of the DCCP 28. The combination of the SFC 64 and DC 72 is referred to as a single fiber controller-deterministic (SFC-D) 74. The SFC-D 74 communicates bi-directionally (half-duplex) via the fiber optic data buses. It provides the control for the operation of the deterministic network protocol including a contention type protocol_ of the DCCP 28.

Since the transceivers $26_{1-N}$ are operated in a circular or ring topology as shown in FIG. 1, the SFC 64 provides an anti-recirculation timer to automatically prevent data packets from being recirculated by deleting such data packets from the network once they are received at all nodes 16. The SFC 64 restores signal quality at each node 16 and provides for pulse width distortion compensation resulting from non-symmetrical high-to-low and low-to-high propagation delays. It also provides optical power monitoring by measuring the magnitude of pulse width distortion which provides a relative implication of optical power strength. The SFC 64 restores the signal pulse width before sending the signal to the DCCP 28 or re-transmitting the signal.

More particularly, and referring particularly to FIG. 2, an exemplary one of the fuel tanks 20 has disposed therein a fuel gauge 86. Here, for example, the fuel gauge 86 is a variable capacitance transducer, it being understood that an ultrasonic transducer or similar means for measuring fuel levels. The variable capacitance gauge 86, for example, includes a pair of plates 88, or electrodes, separated a fixed distance by a dielectric, here the dielectric is the fuel 90 in the tank 20. Thus, as the level of the fuel 90 changes, the capacitance of the capacitive fuel gauge 86 changes. Consequently, a measure of the capacitance of the fuel gauge 86 provides a measure of the fuel 90 in the tank 20 when combined with information such as fuel density, temperature, etc. The capacitive fuel gauge 86 is connected by electrically conductive wires 87 passing through fuel tank 20 into a package 100 bolted to the fuel tank 20, as indicated. The package 100 is used to electro-statically shield: an analog to digital (A/D) converter, or frequency-to-digital converter, or similar such signal conversion device 102; the processing module 18' (i.e., the digital communication processor (DCCP) 28 and the transceiver 26 interfacing such module 18' with the communication media 14); a power monitor 105, and a power supply 104 for the module 18', signal converter 102, and power monitor 105. The signal converter 102, the digital communication processor (DCCP) 28 and the transceiver 26, power monitor 105, and power supply 104, are mounted within the package 100 on one, or more electrically interconnected printed circuit boards, not shown. The signal converter 102 is used to convert the analog signal produced by the capacitive fuel gauge 86 into a corresponding digital signal for the DCCP 28. The DCCP 28 is used to sample the fuel quantity signal, average, calibrate, filter, and provide whatever signal processing is required right at the sampling fuel signal point.

The package 100 is an electro-static shielding enclosure which may be a conductor, such as a metal enclosure or a dielectric enclosure coated or clad with an electrical conductor to provide an electro-static enclosure for the signal conversion device 102, the digital communication processor (DCCP) 28 and the transceiver 26, and other electrical components in the package 100. The package has an electrically conductive (i.e., electro-statically shielding) cover 101 attached to the top section 103 of the package. In addition to the processing module 18', the package 100 provides an electro-statically shielding enclosure to a power supply 104 and power monitor 105. The package 100 is provided wit a data interface 108, here including a fiber optic connector 109 (such as that described in U.S. Pat. No. 6.062,739, entitled "Fiber Optic Connector", filed Jul. 23, 1998, David Blake, Randolph Holtgrefe and Brian Morrison, assigned to the same assignee as the present invention, the entire subject matter thereof being incorporated herein by reference) for coupling data through the enclosure of package 100 to, and from, the processing module 18' through a dielectric (e.g., an electrical insulating) transmission media, here fiber optic connection media 14, here fiber optic cables passing Through the package 100. The power supply 104, which here includes a solar, or photo cell 120 and DC/DC converter 107, is adapted to generate power, for the processing module 18' and other electronics in the package 100, in response to input energy, here laser, or light (i.e. optical) generated energy. An energy interface 110, here includes a fiber optic connector similar to tat used in the interface 108, is provided for coupling the laser energy from a laser source 122 (FIG. 1) external to the package 100 to the processing module 18' to the other electronics electro-statically shielded within the package 100. The energy interface 110 couples the energy from the source 122 (FIG. 1) to the power supply 104 through a dielectric transmission media, here a fiber optic cable 124 (FIGS. 1 and 2), passing trough the enclosure of package 100. As noted above the package is bolted to the fuel tank 20, which tank 20 is aluminum, and hence is also electrically shielding, as indicated in FIG. 2.

Thus, the package 100 is provided with a pair of connectors 126, 127; connector 126 being mounted to the package 100 is used to mate with connector 127 mounted to the fuel tank 20 and which is electrically connected to the plates 88 of the capacitor fuel sensor 86. This first connector 126 is electrically connected to the signal conversion device 102, here producing a frequency related to the capacitance. Here, for example, the capacitor is serially connected to a resistor to provide an R-C network having a time constant which is the product of the fixed resistor and the capacitance which, as noted above, varies with the amount of fuel in the tank, it being understood that other means of interfacing a capacitance or ultra-sonic probe familiar to those skilled in the art may also be used. A series of pulses is fed to the R-C network an a threshold voltage is reached at times after the commencement of each pulse which is a function of the capacitance and hence the amount of fuel in the tank. Thus, the frequency produced by the signal conversion device 102 is related to the amount of fuel in the tank. This frequency is fed to the processor by electrical conductors between the first connector and the conductors of the printed circuit boards and to the processor. other devices, such as a modulator/demodulator of capacitance to frequency converter may also be used to convert the capacitance of the gauge to digital data.

In any event, the data to and from the processing module 18' is fed, via a second connector, here the data interfaces 108, which includes a pair of bi-directional photo diodes 68, 70. The light energy produced by the photo-diodes is coupled through fiber optic cables 14 via connectors, as shown. Thus, the transmission media 14 used for feeding data as modulated light energy into the processor transceiver and out of the processor via the transceiver is a dielectric media which inhibits electrical signals or disturbances which may be generated externally of the package 100 from entering the electro-statically shielded package 100.

The power supply 104 for the electronics in the package 100 is generated from the photocell or laser energy power converter 120 which is illuminated by laser 122 (FIG. 1) energy introduced onto the photocell 120 via the fiber optic cable 124. It is noted that the cable 124 is a dielectric and thus maintains the electro-static shielding effect of the enclosure provided by the package 100. The power from the laser 122 is typically about one watt, or less. Therefore, with a 50% efficiency factor, about a half of a watt of power is generated within the package 100. The photocell produces about 1.2 volts per cell. Thus, serially connected 6 cells produces a voltage of about 7.2 volts. The voltage is regulated by the DC/DC converter 107 for the signal conversion device 102, processing module 18', and power monitor 105.

In the event of a failure, or reduction in light energy from the laser 122, there will be a reduction in the power generated by the photocell 120 and hence the amount of energy generated by the power monitor 105. The amount of power measured by the power monitor 105 is fed to the DCCP 28 and is transferred as data by the transceiver to the system 12 via the fiber optic cables 14. If the energy generated by the photocell falls below some threshold level, which may indicate a break, or leak, in the fiber optic cable 124 conveying the laser 122 energy to the photocell 120, it will be detected by one of the processing elements 18. Once detected, such processing element 18 provides a control signal to the laser 122 which is providing the energy source to the photocell 120 to turn such power laser 122 off. Similarly, for safety reasons, a node in a safe region of the aircraft continuously monitors the optical network messages, and, when it sees a weak link developing, it turns off the laser source, thereby ensuring that a break in the fiber optic cable or a loose connection will not allow stray laser energy to impinge on any surface where such stray laser energy might cause an eye safety concern.

Figure 3:
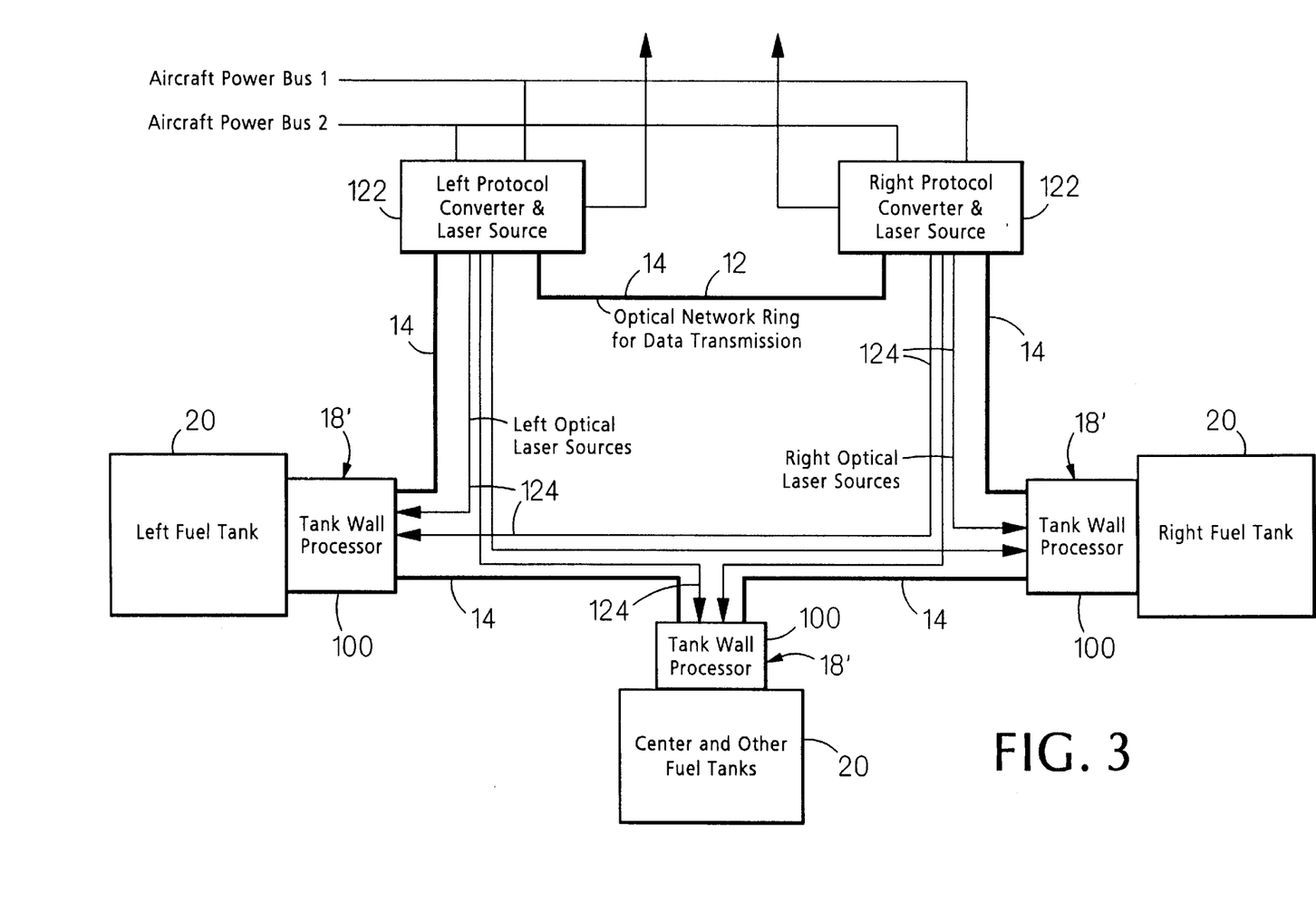

Referring now to FIG. 3, a typical arrangement is shown for an aircraft having left, right and center, and other, fuel tanks 20. Here, the packages 100 electro-statically shielding processing elements 18' are mounted to the fuel tanks, as described above in connection with FIG. 2 and here, have a pair of energy interfaces 110 for providing redundant photocells 120 instead of a single photocell. Here there are redundant lasers 122 each one connected to a different aircraft power bus. The data fiber optic cables 14 pass between the processing elements 18' and the optical network 12. Each laser source 122 has three fiber optic cables 124 for coupling the laser energy it produces to the three tanks 20, as indicated, for redundancy.

Other embodiments are within the spirit and scope of the appended claims.

What is claimed is:

1. A system comprising:
   an electro-statically shielded enclosure,
   at least one processor external to the enclosure,
   at least one processor disposed in the enclosure, and,
   at least one dielectric media to couple the at least one processor external to the enclosure and the at least one processor disposed in the enclosure.

2. A system according to claim 1, further including:
   at least one energy source external to the enclosure,
   at least one power supply disposed in the enclosure, at least one dielectric media to couple the energy source external to the enclosure and the at least one power supply disposed in the enclosure.

3. A system according to claim 2, wherein the at least one power supply disposed in the enclosure is in communications with the at least one processor disposed in the enclosure.

4. A system according to claim 2, wherein the at least one energy source is a laser.

5. A system according to claim 2, wherein the at least one power supply disposed in the enclosure is a laser energy power converter.

6. A system according to claim 2, wherein the at least one dielectric media to couple the at least one energy source external to the enclosure and the at least one power supply disposed in the enclosure includes a fiber optic cable.

7. A system according to claim 2, further including a power monitor disposed in the enclosure, the power monitor in communications with the at least one processor disposed in the enclosure, and the power monitor in communications with the power supply disposed in the enclosure.

8. A system according to claim 1, wherein the at least one processor disposed in the enclosure includes at least one of a media access controller, a network processor, and an applications processor.

9. A system according to claim 1, further including a transceiver disposed in the enclosure, the transceiver in communications with the at least one processor disposed in the enclosure.

10. A system according to claim 1, further including at least one photo-diode to interface between the at least one processor external to the enclosure and the at least one processor disposed in the enclosure.

11. A system according to claim 1, wherein the at least one dielectric media to couple the at least one processor external to the enclosure and the at least one processor disposed in the enclosure includes a fiber optic cable.

12. A system according to claim 1, further including a first connector and a second connector, wherein the first connector and the second connector are mated, and wherein the first connector is mourned to the enclosure, and the second connector is mounted external to the enclosure to provide an electrical connection to a sensor.

13. A system according to claim 12, wherein the second connector is mounted to a fuel tank, and the sensor is a fuel sensor.

14. A system according to claim 12, wherein the first connector is in communications with the at least one processor disposed in the enclosure.

15. A system for measuring fuel, the system comprising:
an electro-statically shielded enclosure,
at least one processor disposed in the enclosure,
a fuel tank, and,
a fuel sensor in communications with the fuel tank and the at least one processor disposed in the enclosure.

16. A system according to claim 15, further including:
a first connector mounted to the enclosure and in communications with the at least one processor disposed in the enclosure, and,
a second connector mounted to the fuel tank, the second connector mated to the first connector, the second connector in communications with the fuel sensor.

17. A system according to claim 16, further including a signal conversion device to accept an input from the first connector and provide an output to the at least one processor disposed in the enclosure.

18. A system according to claim 15, wherein the fuel sensor includes a variable capacitance transducer.

19. A system according to claim 15, further including at least one power supply disposed in the enclosure.

20. A system according to claim 15, wherein the fuel tank is an aluminum fuel tank.

21. A system according to claim 15, wherein the enclosure is mounted to the fuel tank.

22. A system according to claim 15, further including:
at least one energy source external to the enclosure,
at least one power supply disposed in the enclosure,
at least one dielectric media to couple the at least one energy source external to the enclosure and the at least one power supply disposed in the enclosure.

23. A system according to claim 22, wherein the energy source is a laser.

24. A system according to claim 22, wherein the at least one power supply disposed in the enclosure is a laser energy power converter.

25. A system according to claim 22, wherein the at least one dielectric media to couple the at least one energy source and the at least one power supply disposed in the enclosure includes a fiber optic cable.

26. A system according to claim 15, further including:
at least one processor external to the enclosure, and,
at least one dielectric media to couple the processor external to the enclosure and the at least one processor disposed in the enclosure.

27. A system according to claim 21, wherein the at least one dielectric media to couple the at least one processor and the at least one processor disposed in the enclosure includes a fiber optic cable.

28. A method for providing a measurement from a fuel tank, the method comprising:
providing an electro-statically shielded enclosure including at least one processor disposed in the enclosure,
providing at least one processor external to the enclosure,
providing a fuel tank sensor in communications with the fuel tank and the at least one processor disposed in the enclosure, and,
providing at least one dielectric media to couple the at least one processor external to the enclosure and the at least one processor disposed in the enclosure.

29. A method according to claim 28, further including:
providing at least one energy source external to the enclosure,
providing at least one power supply disposed in the enclosure, the at least one power supply in communications with the at least one processor disposed in the enclosure, and,
providing at least one dielectric media to couple the at least one energy source and the at least one power supply disposed in the enclosure.

30. A method according to claim 29, wherein providing at least one dielectric media to couple the at least one energy source and the at least one power supply disposed in the enclosure includes providing a fiber optic cable.

31. A method according to claim 29, further including providing a power monitor in communications with the at least one power supply and the at least one processor disposed in the enclosure.

32. A method according to claim 28, wherein providing a fuel tank sensor in communications with the fuel tank and the at least one processor disposal in the enclosure, includes:
providing a first connector mounted to the enclosure and in communications with the at least one processor disposed in the enclosure, providing a second connector mounted to the fuel tank, the second connector in communications with the fuel tank sensor and the second connector mated to the first connector.

33. A method according to claim 28, wherein providing at least one dielectric media to couple the at least one processor external to the enclosure and the at least one processor disposed in the enclosure includes providing a fiber optic cable.

* * * * *